United States Patent
Shoda et al.

(10) Patent No.: US 7,227,665 B2
(45) Date of Patent: Jun. 5, 2007

(54) IMAGE MAGNIFICATION CHANGING APPARATUS

(75) Inventors: Hirokazu Shoda, Yokohama (JP); Sunao Tabata, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 925 days.

(21) Appl. No.: 10/347,597

(22) Filed: Jan. 22, 2003

(65) Prior Publication Data

US 2004/0141205 A1 Jul. 22, 2004

(51) Int. Cl.
*G06F 15/00* (2006.01)
*G06K 1/00* (2006.01)

(52) U.S. Cl. ............. 358/1.17; 348/523; 358/1.2; 382/244

(58) Field of Classification Search ............... 358/1.17, 358/1.15, 525, 426.13, 462, 1.12, 465; 382/244, 382/272, 166, 176, 298; 710/36; 348/500, 348/523, 561
See application file for complete search history.

(56) References Cited

U.S. PATENT DOCUMENTS

| | | | | |
|---|---|---|---|---|
| 4,827,433 A | * | 5/1989 | Kamon | 345/668 |
| 5,444,832 A | * | 8/1995 | Suzuki | 345/673 |
| 5,461,682 A | * | 10/1995 | Nomura | 382/232 |
| 5,574,833 A | * | 11/1996 | Yoshiaki | 358/1.9 |
| 5,644,366 A | * | 7/1997 | Ushida et al. | 348/625 |
| 5,704,019 A | * | 12/1997 | Akiyama et al. | 358/1.1 |
| 6,181,823 B1 | * | 1/2001 | Takahashi | 382/232 |
| 6,215,904 B1 | * | 4/2001 | Lavallee | 382/234 |
| 6,377,360 B1 | * | 4/2002 | Hattori | 358/1.5 |
| 6,411,741 B1 | * | 6/2002 | Hamamura et al. | 382/254 |
| 6,466,693 B1 | * | 10/2002 | Otsu et al. | 382/176 |
| 6,486,971 B1 | * | 11/2002 | Kawamoto | 358/1.2 |
| 6,765,206 B2 | * | 7/2004 | Sugiyama et al. | 250/330 |

FOREIGN PATENT DOCUMENTS

JP 5-7293 A 1/1993

* cited by examiner

*Primary Examiner*—Aung Moe
*Assistant Examiner*—Dillon Murphy
(74) *Attorney, Agent, or Firm*—Foley & Lardner LLP

(57) ABSTRACT

After an image compressed by a compressing portion is stored in a page memory, it is decoded by a decoding portion. A sub-scanning enlargement portion carries out sub-scanning direction enlargement processing upon the image decoded by the decoding portion and a printer prints out the enlarged image. At this time, the printer generates a printer synchronous signal each time when it scans an image formation object surface. A control portion provides the page memory, the decoding portion and the magnification changing portion with control signals so as to synchronize reading out of the image from the page memory, the decoding of the decoding portion and enlargement processing of the sub-scanning enlargement portion.

22 Claims, 14 Drawing Sheets

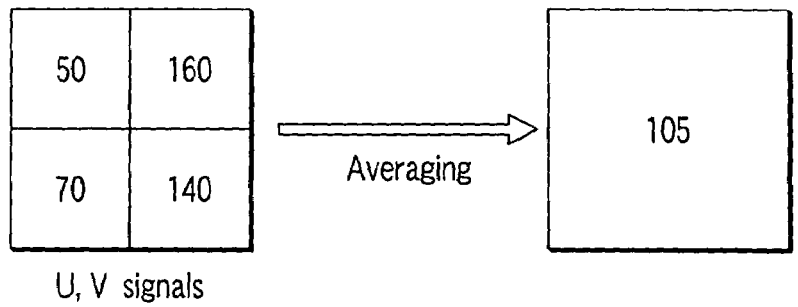
FIG. 4
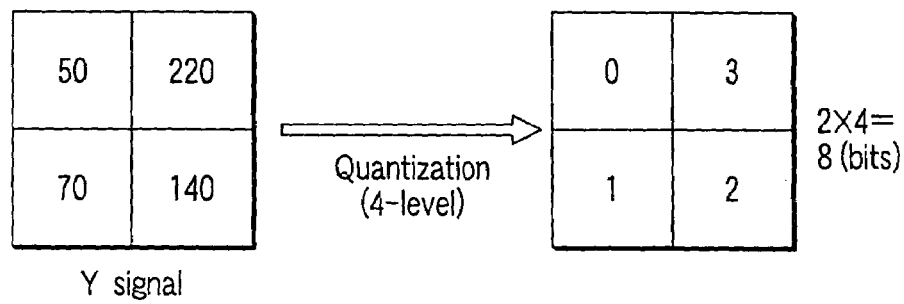
FIG. 5A
Y-signal quantization table
| Quantization value | Inputted value range |
| --- | --- |
| 0 | 0~60 |
| 1 | 61~130 |
| 2 | 131~200 |
| 3 | 201~255 |
FIG. 5B

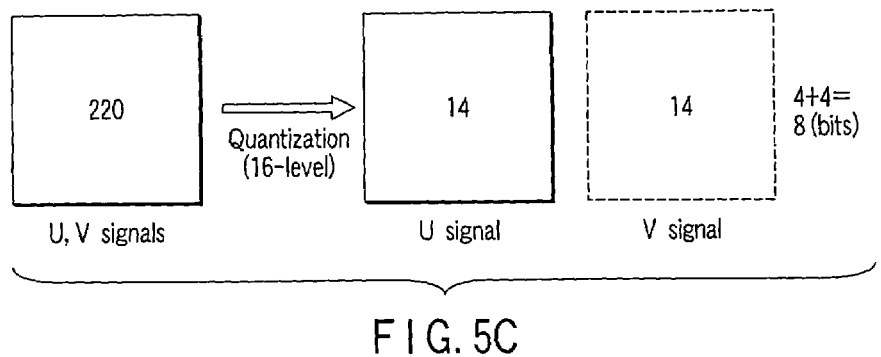
FIG. 5C
U, V signal quantization table
| Quantization value | Inputted value range |
|---|---|
| 0 | −255~−210 |
| 1 | −209~−150 |
| ... | ... |
| 14 | 180~220 |
| 15 | 221~255 |
FIG. 5D
Error distribution
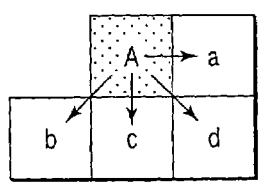
A : Quantization object pixel
a~d : Distribution ratio (a+b+c+d=1.0)
Error value : if the value of the above Y signal is 50
50−60=<u>−10</u>
      error amount
FIG. 5E

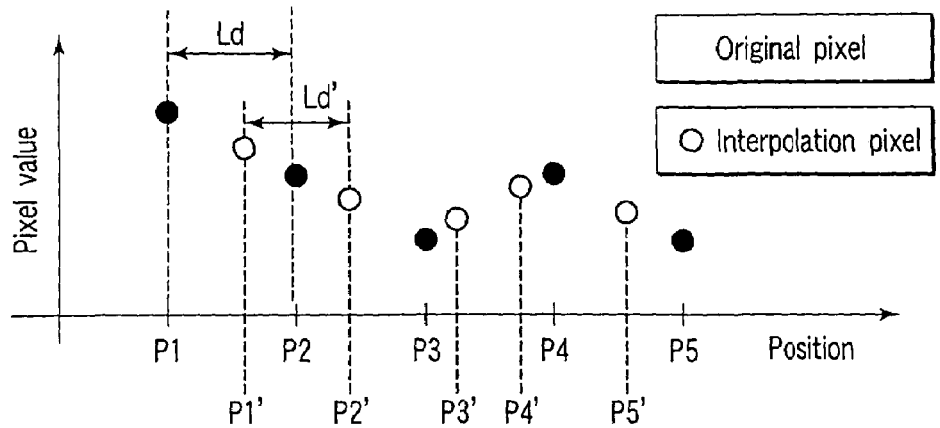
FIG. 7A
| | Coefficient : (Mag) | Coefficient : (1-Mag) | Equation |
|---|---|---|---|
| P1' | 0.7 | 0.3 | 0.3×P1+0.7×P2 |
| P2' | 0.6 | 0.4 | 0.6×P2+0.4×P3 |
| P3' | 0.9 | 0.1 | 0.9×P3+0.1×P4 |
| P4' | 0.2 | 0.8 | 0.2×P3+0.8×P4 |
| P5' | 0.5 | 0.5 | 0.5×P4+0.5×P5 |
FIG. 7B
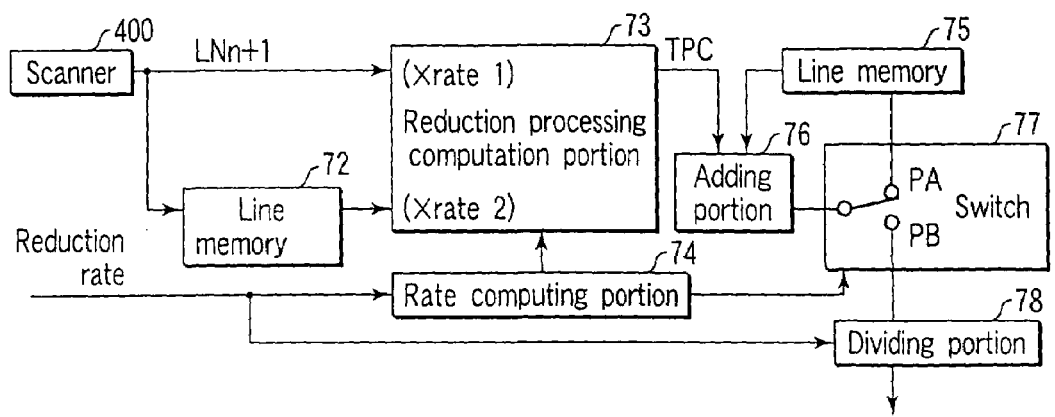
FIG. 8

FIG. 14A  Original paper

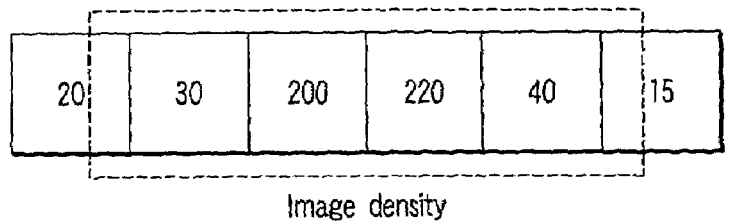
Image density
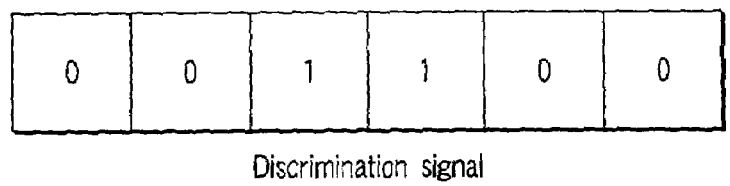
Discrimination signal
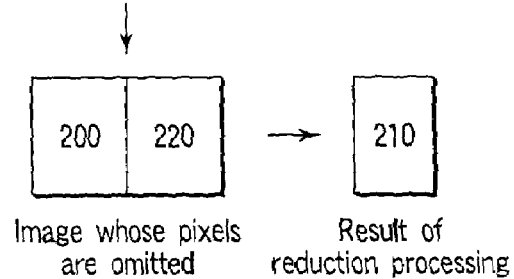
Image whose pixels are omitted    Result of reduction processing
FIG. 15A
FIG. 15B
FIG. 15C
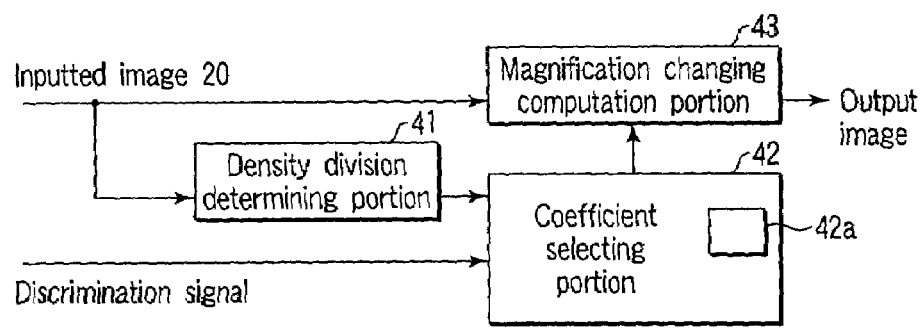
FIG. 16

FIG. 17A

| 20 | 30 | 200 | 220 | 160 | 15 |

Image density

FIG. 17B

| 0 | 0 | 1 | 1 | 0 | 0 |

Discrimination signal

FIG. 17C

| Density 1 | Density 1 | Density 3 | Density 3 | Density 2 | Density 1 |

Density determining result

FIG. 17D

| Density division | Discrimination 0 | Discrimination 1 |
|---|---|---|
| Density division 1 | 0.3 | 0.3 |
| Density division 2 | 0.5 | 1.0 |
| Density division 3 | 0.8 | 1.2 |

Coefficient table /42a

FIG. 17E

| 0.3 | 0.3 | 1.2 | 1.2 | 0.5 | 0.3 |

Coefficient of each pixel

FIG. 18A  | 0.3 | 0.3 | 1.2 | 1.2 | 0.5 | 0.3 |   Coefficient C

↓ Multiplication

FIG. 18B  | 0.3 | 1.0 | 1.0 | 1.0 | 1.0 | 0.2 |   Rate R

↓ Multiplication

FIG. 18D  | 20 | 30 | 200 | 220 | 160 | 15 |   Pixel value P

↓ Multiplication

FIG. 18E  | 1.8 | 9 | 240 | 264 | 80 | 0.9 |   C×R×P

↓ Addition and division

IMAGE MAGNIFICATION CHANGING APPARATUS

BACKGROUND OF THE INVENTION

The present invention relates to an image forming apparatus such as PPC and FAX and more particularly to an image magnification changing apparatus which reduces or enlarges the magnification of an image by image processing.

Conventionally, there has been widely used an image reducing method which stores image data necessary for reduction of image in multiple line memories and achieves reduction processing by a processing through a projection method.

Because, according to the prior art, the capacity of a necessary line memory increases as the reduction rate decreases (as the image size is reduced), the image processing apparatus needs to have a line memory having a capacity necessary for its minimum reduction rate. For example, in case of a reduction by 16%, a line memory for seven lines is required thereby leading to a rise of cost.

A conventional image enlarging method, as disclosed in, for example, Jpn. Pat. Appln. KOKAI Publication No. 5-7293, stores an inputted image in its page memory and executes enlargement processing in a sub-scanning direction while reading an image from the page memory. This prevents an operating speed of the ASIC from rising, and consequently, an image output synchronous with a printer synchronous signal is realized.

However, in case of such prior art, image data for one page needs to be stored, so that a memory amount increases tremendously thereby leading to an increase of cost. Further, when the magnification changing processing for reduction or enlargement is carried out, the density of a character edge portion drops so that a character or a narrow line becomes blurred.

Furthermore, when the enlargement processing and the filter processing are carried out on the same image, the filter size is increased exponential-functionally depending on the enlargement rate of the filter size. For example, if the filter size at 100% is set to N×N, in order to achieve the same characteristic as the filter characteristic at the time of 100% on an image after the enlargement, the filter size needs to be (N× magnification)×(N× magnification). More specifically, if both main scanning and sub-scanning are executed at 200%, N is 11, and 23×23 size is necessary. When the enlargement and filter processing are executed on an image, the filter size is increased, thereby leading to a rise of H/W (hard wear) cost, which is a problem to be solved.

To the contrary, when the filter processing is carried out before the enlargement and then, the enlargement processing is carried out, there occurs such a problem that the character and line edge become blurred, thereby sharpness thereof being dropped. The same thing can be said of image reduction processing.

BRIEF SUMMARY OF THE INVENTION

An object of the present invention is to provide an image processing apparatus which executes magnification changing processing with a memory having a smaller capacity than a conventional one and outputs a magnified or reduced image synchronously with a printing speed of a printer.

In order to achieve the above object, according to one aspect of the present invention, there is provided an image processing apparatus comprising: a compressing portion which compresses an inputted image; a page memory which stores the compressed image from the compression portion; a decoding portion which decodes the compressed image stored in the page memory; a control portion which controls write and read of the image with respect to the page memory; a magnification changing portion which carries out magnification changing processing of changing the image size for the image decoded by the decoding portion; and a printer which prints the image magnified or reduced by the magnification changing portion. The printer generates a printer synchronous signal each time when the printer scans an image formation object surface. The control portion supplies the page memory, the decoding portion and the magnification changing portion with control signals so as to synchronize reading of the image from the page memory, the decoding processing of the decoding portion and the magnification changing processing of the magnification changing portion with the printer synchronous signal provided from the printer.

According to the aspect, it is possible to decrease a memory amount of the page memory by compressing image data before writing in the page memory. By controlling the decoding timing, synchronization with the printer synchronous signal is realized and the magnified or reduced image can be provided synchronously with the printing speed of the printer.

According to another aspect of the present invention, there is provided an image processing apparatus comprising: a discriminating portion which discriminates a character region and a photograph region of an inputted image and outputs a corresponding discrimination signal; and a magnification changing portion which changes a magnification changing method for the character region and the photograph region based on the discrimination signal outputted from the discriminating portion and changes the magnification of the inputted image.

The magnification changing portion comprises: an averaging processing portion which carries out magnification changing processing on an inputted image based on the averaging processing; a emphasis processing portion which carries out the magnification changing processing on the inputted image based on the emphasis processing; and a processing type determining portion which determines a processing type based on the discrimination signal provided from the discriminating portion, selects the averaging processing portion for the photograph region while the emphasis processing portion for the character region and executes a processing of the processing portion selected for the inputted image.

According to this aspect, by changing over the magnification changing processing method depending on the character region and the photograph region, an excellent quality image without any blur in character or line can be obtained.

BRIEF DESCRIPTION OF THE SEVERAL VIEWS OF THE DRAWING

FIG. 4 is a diagram showing U, V signal averaging of compression processing according to the first embodiment of the present invention;

FIGS. 5A to 5E show quantization of the compression processing according to the first embodiment of the present invention;

FIGS. 7A and 7B show linear interpolation operation according to the first embodiment of the present invention;

FIG. 8 is an entire block diagram of an image processing apparatus according to a second embodiment of the present invention;

FIGS. 14A and 14B are conceptual diagrams showing a character region and a photograph region in a region identification processing according to the third embodiment of the present invention;

FIGS. 15A to 15C are diagrams for explaining emphasis processing;

FIG. 16 is a block diagram showing an internal processing block of a magnification changing portion according to the third embodiment of the present invention;

FIGS. 17A to 17E are diagrams showing the emphasis processing according to the third embodiment of the present invention;

FIGS. 18A to 18F are diagrams showing a condition for computing pixels in a reduced image according to a discrimination result and coefficient according to a fourth embodiment of the present invention;

FIG. 20 is an entire block diagram of an image processing apparatus according to a sixth embodiment of the present invention;

DETAILED DESCRIPTION OF THE INVENTION

Figure 1:
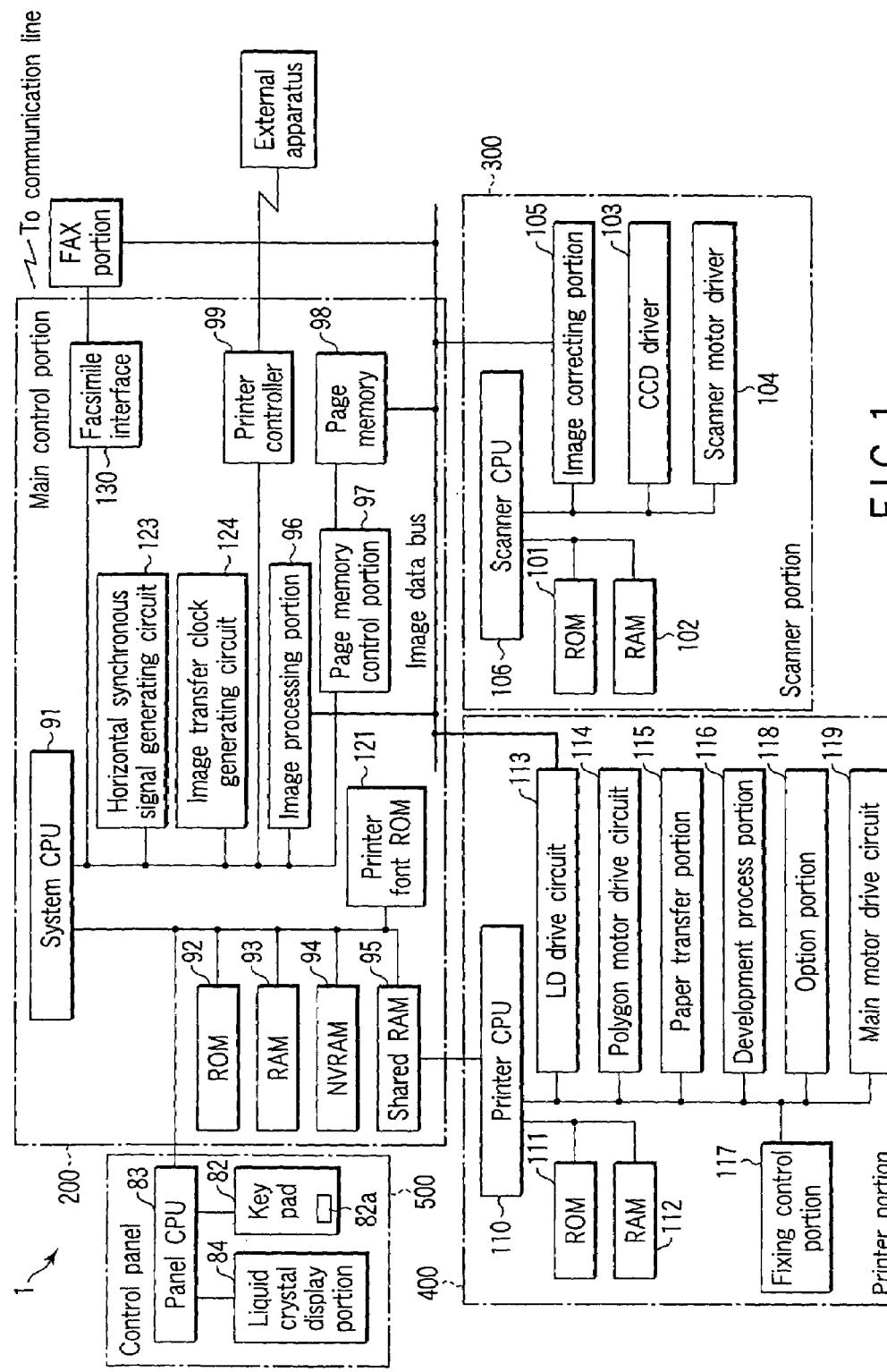
FIG. 1 is a block diagram showing a configuration of an image forming apparatus to which the present invention is applied.

Hereinafter, embodiments of the present invention will be described with reference to the accompanying drawings. FIG. 1 is a block diagram showing a configuration of an image forming apparatus 1 to which the present invention is applied.

The image forming apparatus 1 includes a scanner portion 300 which reads an original image and provides image data corresponding to the read original image, a printer portion 400 for forming an image on a paper according to image data received from an outside apparatus such as the scanner portion 300, or personal computer (PC) through a printer controller 99, a control panel portion 500 which executes user interface and a main control portion 200 which controls respective portions of the image forming apparatus 1 synthetically based on a user instruction inputted through the control panel portion 500.

The detail of the respective blocks shown in FIG. 1 has been described in U.S. Pat. No. 6,542,714. The present invention is executed by mainly the image processing portion 96. Therefore, mainly the image processing portion 96. Therefore, mainly the image processing portion 96 and its peripheral circuit of the present invention will be described and description of the detail of the other respective blocks is omitted. In the meantime, the U.S. Pat. No. 6,542,714 is included in the present invention.

(First Embodiment)

Figure 2:
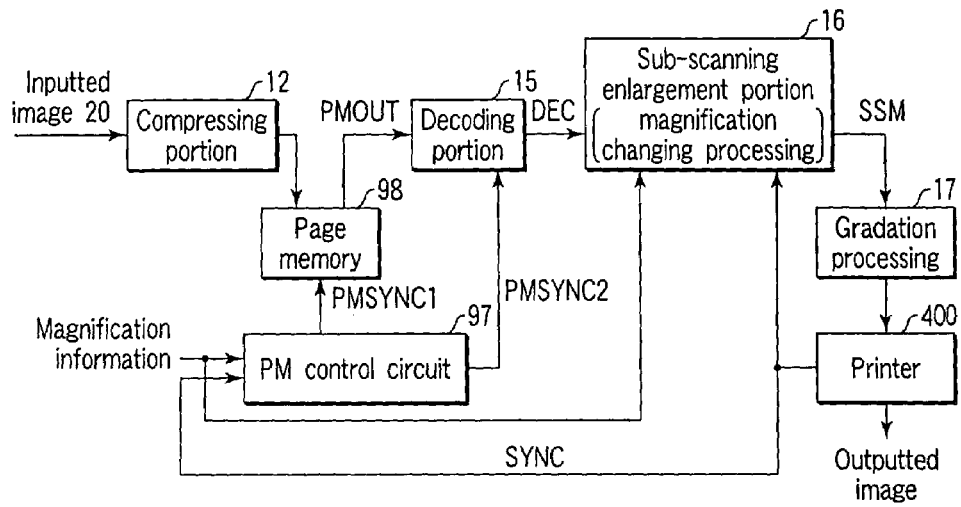
FIG. 2 is a block diagram showing a configuration of a surrounding portion around an image processing portion 96 for executing sub-scanning direction enlargement processing.
Figure 3:
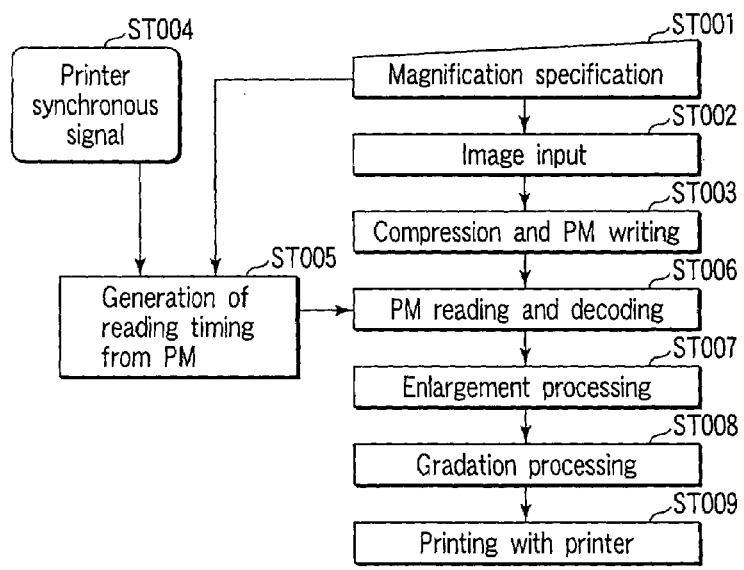
FIG. 3 is a flow chart showing an operation of a first embodiment of the present invention.

FIG. 2 is a block diagram showing a configuration of a surrounding portion of the image processing portion 96 which executes sub-scanning direction enlargement processing. FIG. 3 is a flow chart showing the operation of this embodiment. A compression portion 12, a decoding portion 15, a sub-scanning enlargement portion (magnification changing processing portion) 16, and a gradation processing portion 17 shown in FIG. 2 correspond to the image processing portion 96 in FIG. 1.

As shown in FIG. 2, an image 20 inputted through the scanner portion 300 or the like is compressed by the compression portion 12 and written into a page memory 98 (hereinafter referred to as PM) (ST001 to ST003). The images stored in the PM are read out at a timing generated by a PM control circuit 97 (ST004 to ST006). The image data read out from the PM undergoes decoding processing by the decoding portion 15. The decoded image is enlarged at a specified magnification from the control panel portion 500 by the sub-scanning enlargement portion 16 (ST007). The sub-scanning enlargement portion 16 provides the image enlarged in the sub-scanning direction based on linear interpolation method. In this embodiment, to simplify its description, the sub-scanning enlargement processing will be described as the magnification changing processing, but the magnification changing processing includes main scanning direction enlargement, main scanning direction reduction and sub-scanning direction reduction. In the FIG. 2, main scanning direction enlargement processing is omitted to simplify its description.

The image enlarged by the sub-scanning enlargement portion 16 undergoes gradation processing by the gradation processing portion 17 and is printed out by the printer 400 (ST008 and ST009). The image data SSM outputted from the sub-scanning enlargement portion 16 at this time is synchronous with printer sub-scanning synchronous signal SYNC.

The compression portion 12 executes compression according to a following procedure with RGB image as an input signal. The inputted RGB image is converted to a color space signal YUV according to the following conversion equation.

$$Y = 0.299 \times R + 0.587 \times G + 0.114 \times B$$

$$U = 0.500 \times R - 0.419 \times G - 0.081 \times B$$

$$V = 0.169 \times R - 0.331 \times G + 0.500 \times B$$

(After the above operation, a signal Y is standardized by 0 to 255 and signals U and V are standardized by −255 to 255.)

The converted Signal YUV is separated to brightness (signal Y) and color difference (signals U, V). Further, because the color difference signal affects an image quality a little even if its information amount is reduced (compression rate is increased), the signals U, Y undergo averaging in 2×2 pixel size as shown in FIG. 4. Further because the brightness signal Y induces remarkably image quality deterioration if the averaging processing is carried out like the signals U, V, no averaging processing is carried out unlike the signals U, V so as to quantize each pixel. The quantization mentioned here refers to a processing for lowering the resolution of a pixel signal. For example, the quantization is a processing for converting a pixel resolution of 8 bits into a pixel signal having a 4-bit resolution.

Quantization of the signals Y, U and V is carried out as shown in FIG. 5. The signals Y, U, and V are quantized according to the quantization table determined preliminarily as shown in FIGS. 5B and 5D so as to determine a quantization value. In this case, the signal Y is converted from 8 bits to 2 bits and the averaged signals U and V as shown in FIG. 4 are converted from 8 bits to 4 bits. A quantized pixel signal or a quantization value is outputted from the compression portion 12. In this case, the signal Y is quantized such that bit quantity of the signal Y after quantized at 2×2 pixel size is equal to bit quantities of the signals U, V. That is, the signal Y is expressed in 8 bits as shown in FIG. 5A (2 bits×4) and the signals U and V are expressed in 4 bits each as shown in FIG. 5C. Summing up the bit quantities of U and V produces 8 bits like the signal Y. In this way, the compression portion 12 executes fixed length compression for generating a fixed length compression data from a predetermined length input image data. However, the compression portion 12 may execute variable length compression which generates variable length compression data from the predetermined length input image data.

Further, as shown in FIG. 5E, a difference between the quantized value and a value before the quantization is obtained and that difference is distributed to surrounding pixels at a specified ratio (error diffusion method). Distributing this quantization error to the surrounding pixels enables image quality deterioration by quantization to be reduced. Data quantized at 2×2 pixel size is written into the PM as compression data.

The decoding portion 15 performs inverse-quantization to the quantized data (or carries out YUV-RGB conversion) so as to obtain an original RGB image. At this time, the PM control circuit 97 controls a timing of reading data from the and an output timing of the image data decoded by the decoding portion PM, corresponding to a specified magnification. More specifically, an example of enlargement at 141% will be described with reference to a timing chart shown in FIG. 6.

Each time when an image formation object face (photosensitive drum surface) is scanned with light beam (exposed to light), the printer 400 generates the printer synchronous signal SYNC (for example, low-level pulse). The PM control circuit 14 receives the synchronous signal SYNC from the printer and generates a PM reading signal PMSYNC1 corresponding to a magnification. This signal PMSYNC is generated using Mag which is a linear interpolation coefficient. After receiving the reading command, the PM control circuit 14 computes the interpolation coefficients Mag and 1−Mag in response to a rise of the synchronous signal SYNC. An initqial value Mag1 of the Mag is computed as follows if the magnification is set to 141%.

$$Mag1 = 1.0 - 100/\text{magnification}$$
$$= 1.0 - 100/1.41$$
$$= 0.3$$

A general value Magn of the Mag is computed as follows.

$$Magn = Mag(n-1) + Mag1$$
$$= Mag(n-1) + 0.3$$

In case of Magn>1, $$Magn = Mag(n-1) + Mag1 - 1$$
$$= Mag(n-1) - 0.7$$

is obtained.

If following condition is satisfied twice, the PM control circuit 14 drops the PM reading signal PMSYNC1 to low level in a low-level period of a next synchronous signal SYNC.

Condition: Mag≦initial value of (1−Mag)

The initial value of (1−Mag) is a specified value and the 1−Mag1 is 0.7 here.

Data PMOUT read out from the PM by the signal PMSYNC1 is compression data of two lines. In the same figure, for example, P(L1, L2) means compression data of line 1 and line 2.

The data PMOUNT undergoes decoding processing by the decoding portion 15, so that image data is decoded for every two lines. At this time, in response to a rise of a signal PMSYNC2 which is a signal obtained by delaying the signal PMSYNC1 by a single period of the synchronous signal SYNC, decoded data DEC of two lines is outputted. In the same figure, for example, L1 of the decoded data DEC indicates decoded data of line 1.

The sub-scanning enlargement portion 16 receives the decoded data DEC so as to carry out the sub-scanning direction enlargement processing. For example, the sub-scanning enlargement portion 16 generates an image enlarged in the sub-scanning direction at a specified magnification by linear interpolation computation.

FIG. 7A indicates a condition in which an enlargement of 141% is carried out and a black circle indicates an original pixel while a white circle indicates an interpolation pixel. Assuming that a sub-scanning direction interval of the original pixel is Ld and a sub-scanning direction interval of the interpolation pixel is Ld', pixels are interpolated in an interval of 1/magnification with respect to the original pixel interval as follows.

$$Ld' = (1/\text{magnification}) \times Ld \approx 0.7 \times Ld$$

In this way, pixels are interpolated at the interval of 1/magnification of the original pixel interval. The pixel value of the interpolation pixel undergoes linear interpolation in response to a distance up to pixels on both sides. For example, an interpolation pixel P1' is computed from original images P1 and P2 according to a following equation.

$$P1' = Mag1 \times P1 + (1 - Mag1) \times P2 = 0.3 \times P1 + (1 - 0.3) \times P2$$

Figure 6:
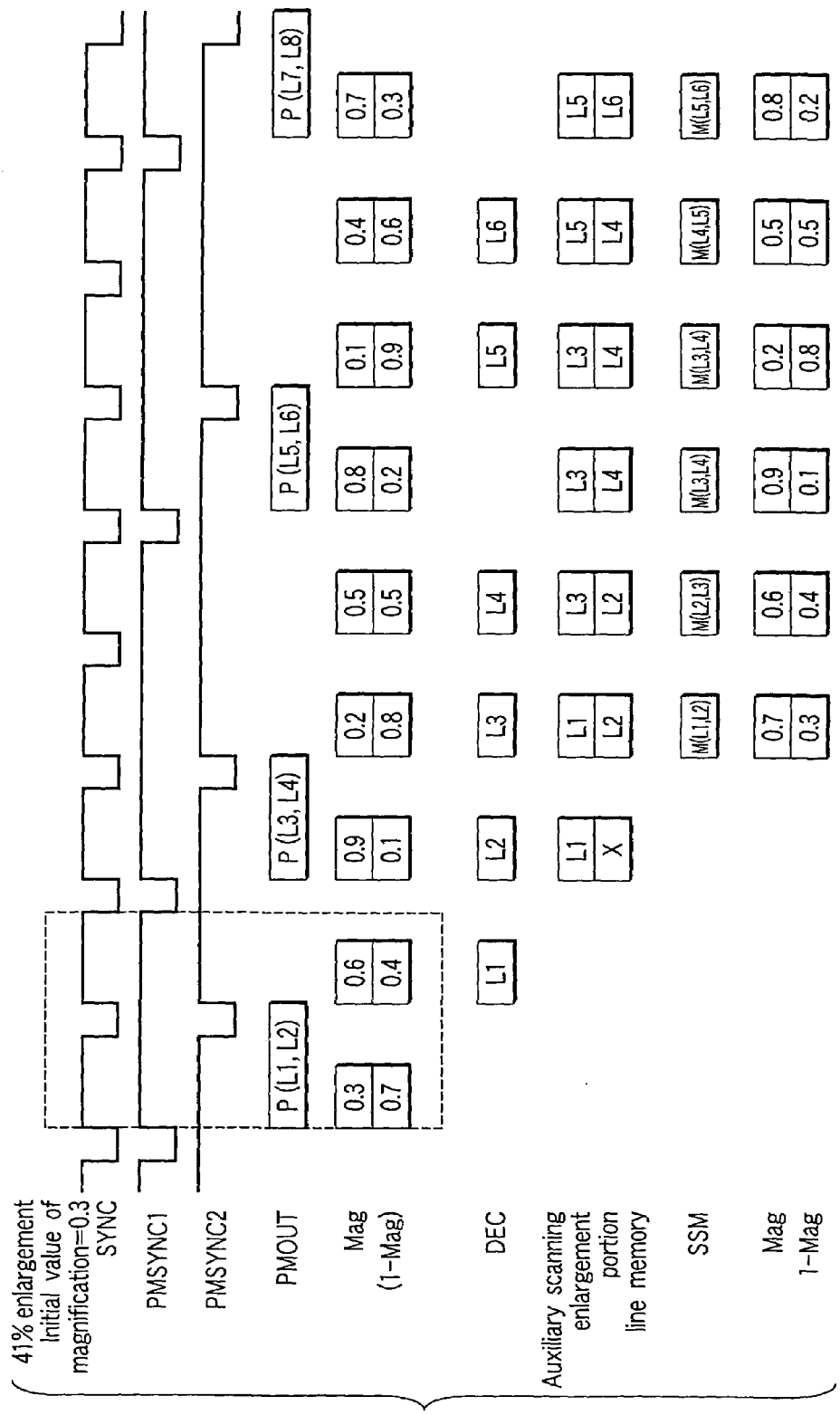
FIG. 6 is a timing chart showing a PM reading timing, decoding timing and sub-scanning enlargement processing timing according to the first embodiment of the present invention.

The interpolation coefficient Mag is changed as the processing progresses as described above. FIG. 7B shows an equation for obtaining pixel values from the interpolation pixel P1' to P5'. As shown in FIG. 6, the sub-scanning enlargement portion 16 has two line memories for original image data. Decoded image data of each line is over-written into these line memories successively as shown in the same figure. The sub-scanning enlargement portion 16 computes the pixel value of the interpolation pixel based on data written into the line memory as shown in FIG. 7B and provides sub-scanning enlargement output SSM as shown in FIG. 6. In the same figure, for example, M(L1, L2) indicates interpolation line image data computed based on the decoded image data L1 and L2. In the meantime, as the Mag and 1-Mag in this computation, Mag and 1-Mag expressed on the bottom are used.

The interpolation pixel SSM computed in this way is outputted synchronously with the printer synchronous signal SYNC as indicated in the timing chart of FIG. 6. Therefore, the interpolation line image data composed of the interpolation pixels is graphically formed by the printer 400 at a pixel interval of the original image, so that an image enlarged to 141% is printed out. Meanwhile, data subjected to the sub-scanning enlargement processing undergoes dither processing by the gradation processing portion 17 and is printed through the printer 400.

By carrying out coding processing of the compression data and computation of the interpolation image data synchronously with the synchronous signal SYNC of the printer, the interpolation image data is provided synchronously with the synchronous signal SYNC. Conventionally, the original image data is stored in a page memory without any compression and read out synchronously with the synchronous signal SYNC. In another conventional system, the compressed data is stored in the page memory and decoded image data of a single page is stored in a page memory different from the PM98 temporarily. After that, the interpolation image data is computed based on the stored image data. Therefore, this embodiment eliminates a necessity of the page memory for storing the decoded image data of a single page and further does not need a high H/W processing speed, thereby achieving reduction of apparatus cost.

In the first embodiment described above, the compression portion/decoding portion may use a compression method other than the aforementioned composition such as JPEG. Although the RGB image is utilized as the inputted image, it is permissible to use monochrome image, CMYK image and the like as well as the RGB image. Further, although the linear interpolation computation is used for the sub-scanning enlargement in the above example, it is permissible to use another enlargement method.

(Second Embodiment)

Figure 9:
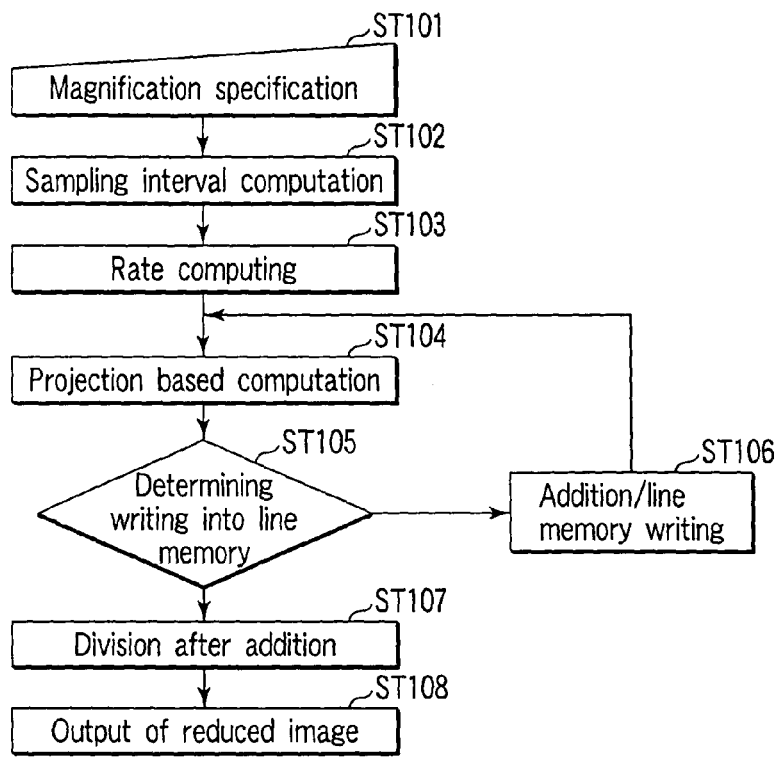
FIG. 9 is a flow chart showing a flow of processing according to the second embodiment of the present invention.

Next, a second embodiment of the present invention will be described with reference to the accompanying drawings. The second embodiment concerns an embodiment about sub-scanning direction reduction processing of an image. FIG. 8 is a block diagram showing a configuration of a sub-scanning direction reduction processing circuit and FIG. 9 is a flow chart indicating the operation of this embodiment. Here, image data of n-th line is referred to as LNn.

The image data LNn of n-th line inputted through the scanner 400 or the like is held by a line memory 72. A reduction processing computing portion 73 executes reduction computation using next inputted image data LNn+1 and image data LNn of a line preceding by a line held by the line memory 72. This reduction computation is carried out by a rate computation portion 74 according to a rate (which will be described later) of every line in response to reduction rate (ST101 to ST104).

The line memory 75 is a 1-line memory which holds a halfway result of the reduction processing, and an adder portion 76 adds a computation result of the reduction processing computation portion 73 to a value of the line memory 75. A switch 77 is a switch which selects which data provided by the adder portion 76 is to be transmitted to the line memory 75 or a dividing portion 78 (ST105 and ST106). The dividing portion 78 divides data provided by the adder portion 76 at a sampling interval corresponding to the reduction rate (ST107). Consequently, a division result is outputted as an reduction image (ST108).

Hereinafter, the reduction computation processing will be described in detail.

The rate computation portion computes a sampling interval Fs corresponding to the reduction rate with respect to a magnification (reduction rate here) specified by the control panel portion 500 or the like.

Figure 10:
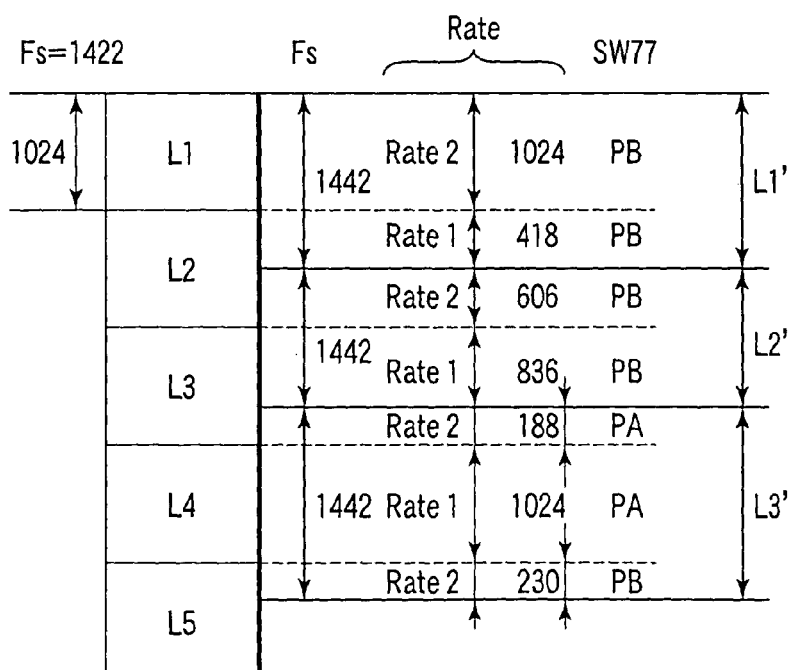
FIG. 10 is a diagram showing a sampling interval of reduction processing according to the second embodiment of the present invention.

FIG. 10 is a diagram for explaining the sampling interval and rate. L1, L2, . . . indicate original pixels arranged in the sub-scanning direction and their pixel values and L1', L2' . . . indicate pixel values of pixels in the reduced pixels and sampling region. The size of the sampling region is sampling interval Fs. The sampling interval Fs indicates a reference amount of the original pixel, which can be obtained according to a following equation.

$$Fs = 100/\text{magnification}$$

For example, reduction of 71% provides Fs=100/71=1.408 (pixels). Assuming that bit accuracy of a pixel is 10 bit ($2^{10}$=1024), the sampling interval Fs is as follows.

$$Fs = (100/71) \times 1024 = 1442$$

The rate of the original pixel in the pixels L1', L2', . . . in the reduced image is computed every sampling interval with respect to the original pixels L1, L2, . . . . The rate refers to a rate of the original image contained in the pixels in the reduced image or the rate of content.

If a 71% reduced image is generated with bit accuracy of a pixel 1024 and sampling interval Fs 1442 as described above, the rate turns to a value shown in FIG. 10. For example, in case of the pixel L1' in the reduced image, the original pixels L1 and L2 are contained and its rate is 1024:418. In case of the pixel L2' in the reduced image, the original images L2 and L3 are contained and its rate is 606:836. In case of the pixel L3' in the reduced image, the original pixels L3, L4 and L5 are contained and its rate is 188:1024:230. The rate computing portion 74 computes these rates.

A reduced image is obtained according to a projection method using a rate obtained by the rate computing portion 74. More specifically, projection type computation on the pixels L1', L2' and L3' in the reduced image in FIG. 10 is shown below.

$$L1'=(1024\times L1+418\times L2)/1442 \qquad (1)$$

$$L2'=(606\times L2+836\times L3)/1442 \qquad (2)$$

$$L3'=(188\times L3+1024\times L4+230\times L5)/1442 \qquad (3)$$

The reduction processing computation portion 73 executes a computation (for example, 1024×L1+418×L2) indicated at a numerator of the projection type computation expressed in the above equations (1) to (3). That is, the reduction processing computation portion 73 multiplies each pixel value of image data Ln+1 inputted through the scanner 400 or the like with a rate 1 (for example 418) provided from the rate computing portion 74 and then, multiplies each pixel value of image data Ln inputted from the line memory 72 with a rate 2 (for example, 1024) provided by the rate computing portion 74. The reduction processing computation portion 73 adds the both multiplied values (for example, 418×L2 and 1024×L1) and outputs an addition result as data TPC.

If the value of the pixels in the reduced image can be computed with image values of two lines like in the above equations (1) and (2), the switch 77 is connected to a PB side of a dividing portion 78 so that the data TPC passes through the adder portion 76 and is divided by the sampling interval 1442 by the dividing portion 78.

Because the above equation (3) provides a reduction computation using pixels of three lines, the reduction processing computation portion 73 cannot compute all at once. Therefore, 188×L3+1024×L4 in the equation (3) is computed and the switch 77 is connected to the PA side of the line memory 75 so that the computation result is written into the line memory 75. If pixel value L5 of a next line is inputted, the reduction processing computation portion 73 multiplies L5 with the rate 1 (230) and outputs L5×230 as the data TPC (because in this case, 0 is inputted as the rate 2, only a multiplied value of the rate 1 is outputted). The data TPC (L5×230) is added to a value (188×L3+1024×L4) held by the line memory 75 by the adder portion 76. At this time, the switch 77 is connected to the PB side of the dividing portion 78, so that an addition result by the adder portion 76 is divided by the sampling interval Fs (1442) by the dividing portion 78.

Because, in this computation, the rate computing portion 74 can determine how many lines are required for the reduction computation according to the sampling interval Fs, switch changeover is carried out based on such a determination result. Such a switch changeover enables accumulated addition, thereby the reduction computation being achieved with a smaller memory capacity than conventional one.

Hereinafter, the operation of the rate computing portion 74 will be described in detail. The rate computing portion 74 computes initial values of the rate 1 and rate 2 of the pixel L1' in the reduced image as follows.

$$\text{Initial value: Rate } 1 = Fs - 1024$$
$$= 1442 - 1024$$
$$= 418$$
$$\text{Rate } 2 = 1024$$

Figure 11:
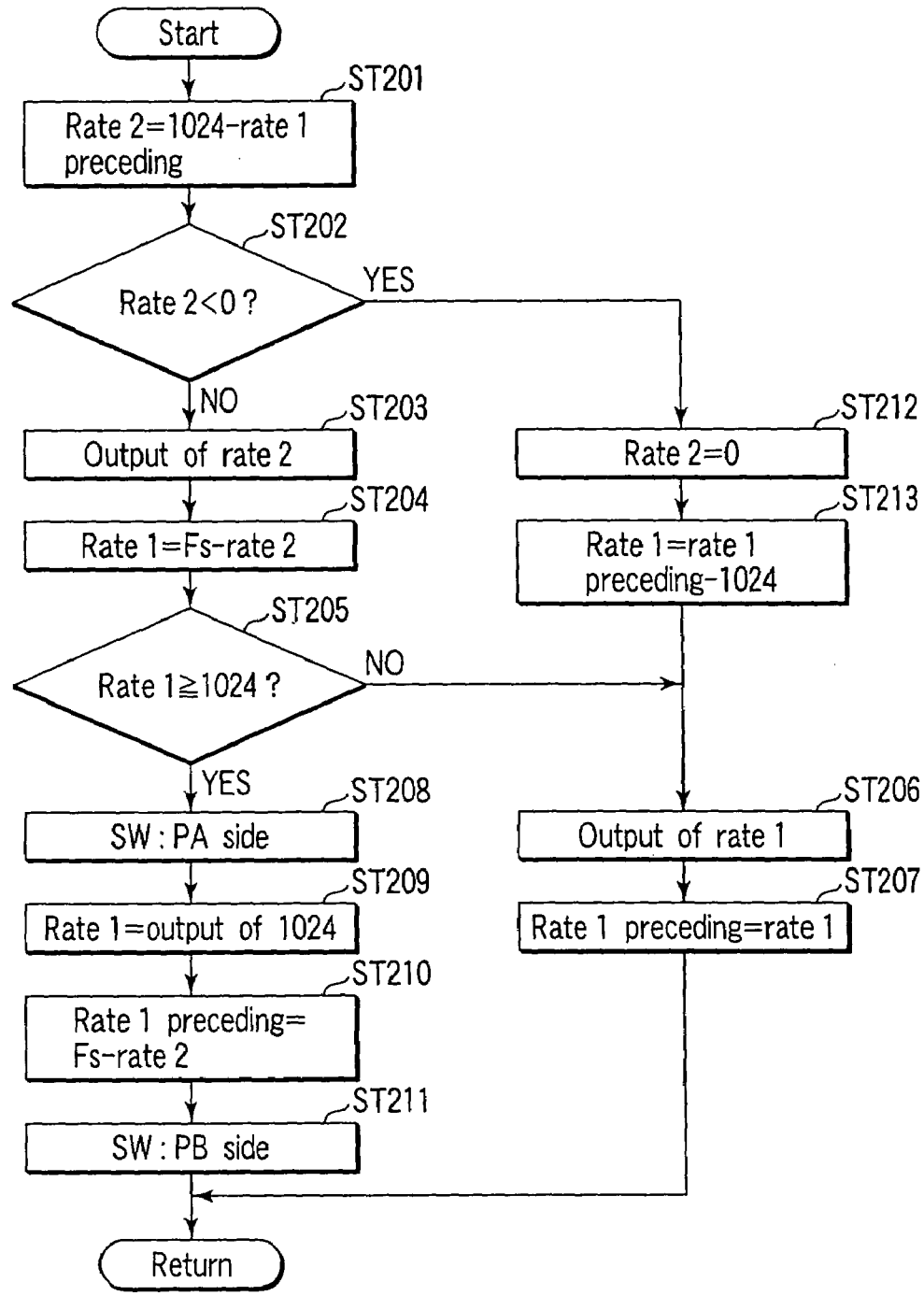
FIG. 11 is a flow chart showing the operation of a rate computing portion 74.

FIG. 11 is a flow chart showing a rate computation processing after the pixel L2' in the reduced image.

In step 201, the rate computation portion 74 computes "rate 2=1024−rate 1 preceding" so as to obtain the rate 2. The "rate 1 preceding" mentioned here refers to a value of the rate 1 preceding by a line (418 here) and therefore, the rate 2 is 606.

In step 202, the rate computing portion 74 determines whether or not the rate 2 is smaller than 0 (minus). In this case, the rate 2 is 606 as computed in step 201 but not a minus value. If the rate 2 is not smaller than 0, the rate computing portion 74 outputs the rate 2 to the reduction processing computation portion 73 like in step 203.

Next, the rate computing portion 74 computes "rate 1=Fs−rate 2" like the step 204 so as to obtain the rate 1. In this case, because the rate 2 is 66 as obtained in step 201 and the Fs is 1442, the rate 1 is 836. In step 205, whether or not the rate 1 is 1024 or more is determined. In this case, because the rate 1 is 836, "NO" is determined and the processing proceeds to step 206. In step 206, the rate 1 (836) is outputted to the reduction processing computation portion 73. In step 207, the rate 1 outputted in step 206 is substituted for the value of the rate 1 preceding. The pixel value L2' of the pixel in the reduced image is obtained as indicated in the above equation (2) by circuit blocks following the rate computing portion 74 based on the rate 1 and the rate 2 computed in this way.

Next, the rate computing portion 74 obtains the rate of the pixel L3' in the reduced image.

Like in step 201, the rate computing portion 74 computes "rate 2=1024−rate 1 preceding" so as to obtain the rate 2. The "rate 1 preceding" is 836 like in step 207 of the aforementioned flow and therefore, the rate 2 is 188.

Like in step 202, the rate computing portion 74 determines whether or not the rate 2 is smaller than 0 (minus). In this case, the rate 2 is 188 as computed in step 201, not a minus value. If the rate 2 is not smaller than 0, the rate computing portion 74 outputs the rate 2 to the reduction processing computation portion 73 like in step 203.

Next, the rate computing portion 74 computes "rate 1=Fs−rate 2" like in step 204 so as to obtain the rate 1. In this case because the rate 2 is 188 as obtained in step 201 and the Fs is 1442, the rate 1 is 1254. In step 205, whether or not the rate 1 is 1024 or more is determined. In this case, because the rate 1 is 1254, "YES" is determined and the processing proceeds to step 208. In step 208, the switch 77 is connected to the PA side and in step 209, 1024 is outputted to the reduction processing computation portion 73 as the rate 1.

The reduction processing computation portion 73 computes two pixel values inputted from the scanner 400 and the line memory 72 based on the rate 1 and rate 2 computed in this way. A computation result TPC (188×L3+1024×L4) of the reduction processing computation portion 73 is stored in the line memory 75 through the adder portion 76 and the switch 77.

In step 210, a value (1254) computed in step 204 as the value of the rate 1 is substituted for the value of the rate 1 preceding and in step 211, the switch 77 is returned to the PB side. Next, the rate computing portion 74 obtains a remaining rate of the pixel L3' in the reduced image.

Like in step 201, the rate computing portion 74 computes "rate 2=1024−rate 1 preceding" so as to obtain the rate 2. The "rate 1 preceding" is 1254 like in step 210 of the aforementioned flow and therefore, the rate 2 is −230.

Like in step 202, the rate computing portion 74 determines whether or not the rate 2 is smaller than 0 (minus). In this case, the rate 2 is −230 as computed in step 201, which is a minus value. When the rate 2 is smaller than 0, the rate computing portion 74 outputs the rate 2 to the reduction processing computing portion 73 as 0 like in step 212.

Subsequently, the rate computing portion 74 computes "rate 1=rate 1 preceding−1024" like in step 213 so as to obtain the rate 1. The "rate 1 preceding" is 1254 like in step 210 of the aforementioned flow and therefore, the rate 1 is 230.

In step 206, the rate 1 (230) is outputted to the reduction processing computation portion 73. In step 207, the rate 1 outputted in step 206 is substituted as the value of the rate 1 preceding.

The reduction processing computation portion 73 computes two pixel values inputted from the scanner 400 and the line memory 72 based on the rate 1 (230) and the rate 2 (0) computed in this way. The computation result TPC of the reduction processing computation portion 73 is added to a value stored in the line memory 75 (L3×188+L4×1024) by the adder portion 76. Therefore, the adder portion 76 outputs "L3×188+L4×1024+L5×230". An output of the adder portion 76 is divided by the Fs (1442) by the dividing portion 78. The operation shown in the above equation (3) is carried out as described above. Following image data provided from the scanner 400 is processed as same above so as to generate a reduced image.

As described above, according to this embodiment, reduction computation is achieved with two line memories. Generally, the minimum sub-scanning reduction ratio of the MFP or FAX is 25%, 16% or the like, so that the conventional reduction type requires the line memory to have six lines or eight lines. However, according to this embodiment, the image reduction processing can be achieved with only two line memories thereby suppressing hardware cost. Although in the above-described embodiment, its reduction computation has been described using projection method, the reduction may be achieved with other computation method than the projection method.

Hereinafter, applied examples of the enlargement and reduction processings according to the present invention, which have been explained in the first and second embodiments will be described as other embodiments.

(Third Embodiment)

Figure 12:
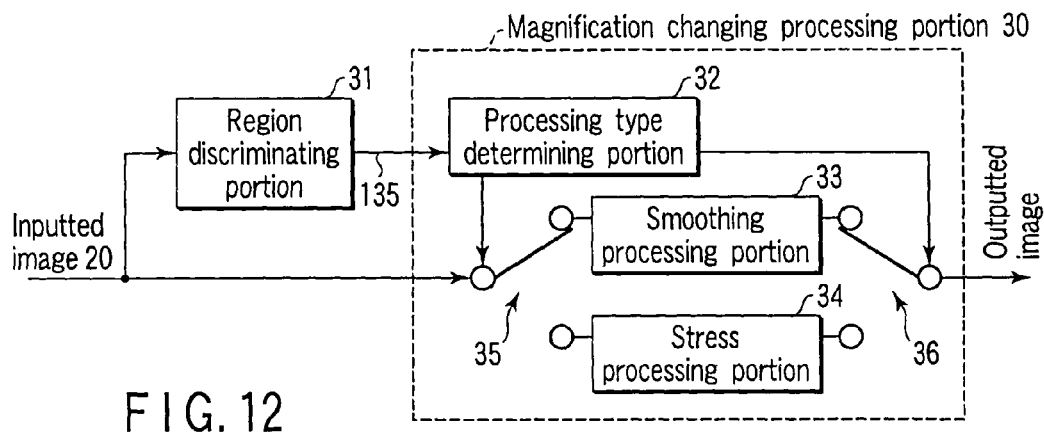
FIG. 12 is an entire block diagram of an image processing apparatus for a processing according to a third embodiment of the present invention.

A third embodiment of the present invention will be described with reference to the accompanying drawings. FIG. 12 is a block diagram showing a configuration of a magnification changing (enlargement or reduction processing) apparatus according to this embodiment. A region discriminating portion 31 discriminates a character region and a photograph region of an inputted image 20. A magnification changing processing portion 30 includes a processing type determining portion 32, an averaging processing portion 33 and a emphasis processing portion 34 so as to execute magnification changing processing. The averaging processing portion 33 carries out the magnification changing processing based on the averaging processing, i.e., a magnification changing processing suitable for the photograph region. The emphasis processing portion 34 carries out a magnification changing processing based on a emphasis processing. i.e., a magnification changing processing appropriate to the character region.

Figure 13:
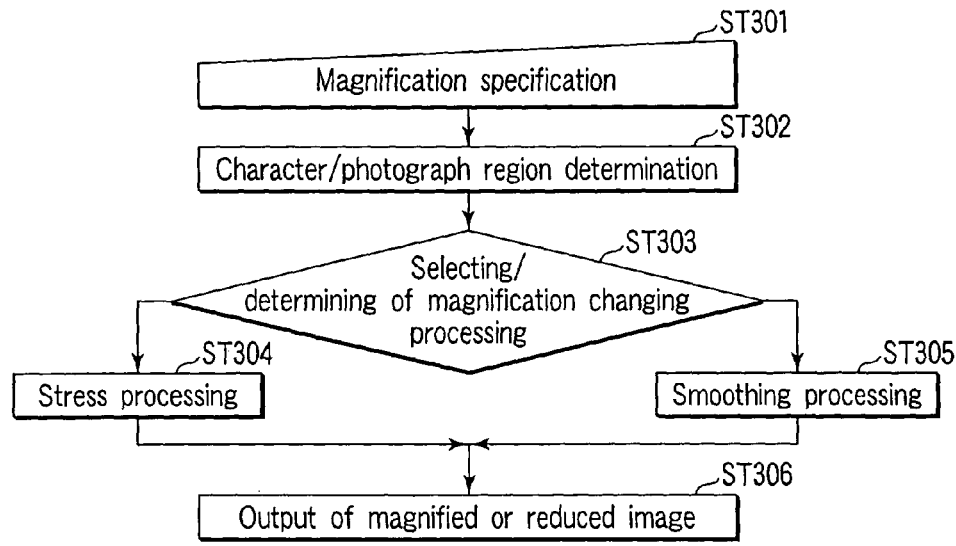
FIG. 13 is a flow chart showing a flow of processing according to the third embodiment of the present invention.

The flow of a processing under the above described configuration will be described with reference to a flow chart of FIG. 13. First, a magnification set up by input means such as a control panel 500 is received (ST301). The region discriminating portion 31 discriminates a character region and a photograph region of an image inputted through the scanner portion 300 or the like, for example, an RGB image (ST302). Receiving this determination result of the character region/photograph region, the processing type determining portion 32 of the magnification changing portion 30 determines a magnification changing processing method. More specifically, the processing type determining portion 32 refers to a discrimination signal in the inputted image region (reference region) necessary for magnification changing processing such as the sampling interval Fs in FIG. 10. A processing method for all pixels in the region is determined according to a following determination condition.

Condition 1: If even a character region of a single pixel exists in the reference region, magnification changing processing for the character is carried out (ST304).

Condition 2: If the condition 1 is not adopted, magnification changing processing for photograph is carried out (ST305).

In this way, the processing type determining portion 32 selects the magnification changing processing for character region and the magnification changing processing for photograph region. By carrying out the magnification changing processing corresponding to a selected processing type, the magnification changing processing portion 30 outputs a magnified or reduced image (ST306). The aforementioned processing type determining method may be substituted by other method. For example, the quantity of pixels determined to exist in the character region and the quantity of pixels determined to exist in the photograph region are counted up and then, a processing suitable for a region having a larger count value may be adopted.

Although the determining method for the character region and photograph region will not be described in detail in this embodiment, edge detection, mesh point determination and the like are combined so as to determine the character region and photograph region.

Figure 14B:
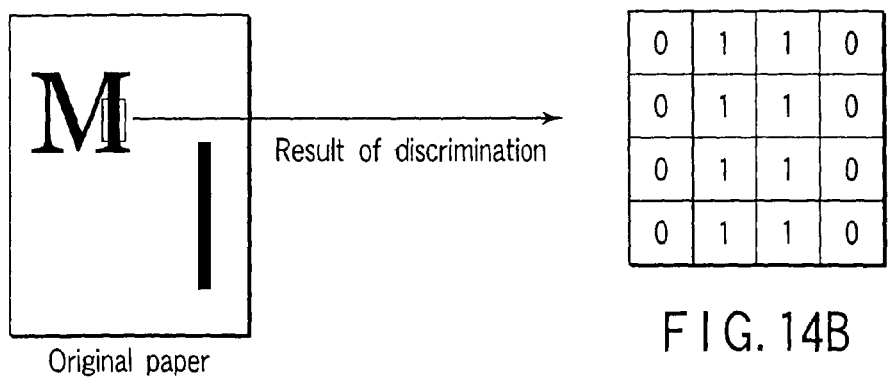

FIG. 14 shows a more specific discrimination result of the region discriminating portion 31. FIG. 14A shows an image density (pixel value) of an original image pixel and FIG. 14B shows a discrimination signal (discriminated portion). 1 indicates the character region while 0 indicates the photograph region. Alphabet and line are determined as the character region and other photograph portion and background portion are determined as the photograph region.

The processing type determining portion 32 in FIG. 12 executes the above-described determination by receiving an input of the discrimination signal 135. The processing type determining portion 32 changes over switches 35 and 36 depending on a processing method determined by the aforementioned determination. The averaging processing portion 33 executes the averaging processing according to, for example, a projection method. The emphasis processing portion 34 executes magnification changing processing using only an image signal of the character region. Specific computation methods of the averaging processing portion and the emphasis processing portion will be described about reduction processing.

The averaging processing portion 33 generates a reduced image according to the projection method. Because the projection method has been already described in the second embodiment, a description thereof is omitted.

The processing of the emphasis processing portion 34 will be described with reference to FIG. 15. Assume that there are image data as shown in FIG. 15A and discrimination information as shown in FIG. 15B. A region indicated with dotted line of image data of FIG. 15A is regarded as the sampling interval for the reduction processing.

By referring to a discrimination signal corresponding to this region, pixels determined to be in the photograph region are excluded from the reduction computation. If the photograph region pixels are excluded, image data as shown in FIG. 15C is provided. Then, computation based on the projection method is carried out on a region necessary for a new reduction computation produced by excluding the pixels. That is, the reduction computation using the projection method is carried out by referring to only the character region pixels, so that a reduction computation result as shown in FIG. 15C is obtained.

By excluding pixels in the photograph region, drop in density of the character, particularly drop in density at an edge portion of a black letter on a white foundation can be prevented and consequently, an excellent quality image can be obtained.

Although in the above described embodiments, the inputted image is the RGB image, it is permissible to adopt a monochrome image or a CMYK image. Although the averaging processing portion 33 and the emphasis processing portion 34 have been described using the projection method, they may be realized by other processing than the projection method. Further, although this embodiment has been explained about the reduction processing, this embodiment may be applied to the enlargement processing as well. Further, this embodiment may be applied to a magnification changing processing in any direction of the main scanning direction and the sub-scanning direction.

(Fourth Embodiment)

Hereinafter, a fourth embodiment of the present invention will be described with reference to the accompanying drawings. An internal configuration of the magnification changing processing portion 30 of the third embodiment is changed as shown in FIG. 16. Because other portion than the magnification changing processing portion is the same as the third embodiment, description thereof is omitted.

The magnification changing processing portion 30 of this embodiment has a density division discriminating portion 41, a coefficient selecting portion 42 and a magnification changing computation portion 43.

The density division discriminating portion 41 has N threshold values (N is an integer of more than 1) and compares the density of the image data with the threshold value so as to discriminate the density division. The coefficient selecting portion 42 selects a coefficient for use in magnification changing computation from a discrimination result and a density division discrimination result. The above processing will be described in detail with reference to FIG. 17.

It is assumed that two thresholds for discriminating the image density are Thres1=50, and Thres2=180. The density division discriminating portion 41 discriminates the density division according to a following equation with these threshold values. The image density is assumed to be D.

Discrimination condition 1: If D<Thres1, the density division is 1.

Determination condition 2: If Thres1≦D<Thres2, the density division is 2.

Determination condition 3: If Thres2≦D, the density division is 3.

If the above-described determination equation is applied to respective pixels shown in FIG. 17A, the determination result shown in FIG. 17C is obtained. The coefficient selecting portion 42 selects the coefficient of each pixel using this determination result and the discrimination result of FIG. 17B with reference to a coefficient table 42a of FIG. 17D. FIG. 17E shows the coefficient selected for each pixel in this way. The coefficient selecting portion 42 transfers coefficients as shown in FIG. 17E to the magnification changing computation portion 43 as the coefficient of each pixel for use in magnification changing computation.

The magnification changing computation portion 43 carries out magnification changing processing using a coefficient selected by the coefficient selecting portion 42. Here, by exemplifying the reduction processing, a specific reduction computation method will be described below with reference to FIG. 18.

As the reduction processing method, for example, a load averaging processing is employed. A rate of a reduction region to each pixel can be obtained from the reduction ratio. Because this obtained rate is equal to the rate obtained according to the projection method to each pixel as indicated in the second embodiment, description thereof is omitted.

As shown in FIG. 18, a coefficient C (FIG. 18A) obtained by the coefficient selecting portion 42 is multiplied with a rate R (FIG. 18B) of the original image to each pixel. Each pixel value (FIG. 18D) is multiplied with a multiplication result C×R (FIG. 18C). A multiplication result C×R×P (FIG. 18E) of the pixel values is divided by a total sum of the multiplication result obtained in FIG. 18C (FIG. 18F).

By determining the coefficient based on the density of each pixel and discrimination information and executing reduction computation, an influence given on a reduced image differs depending on the photograph region and the character region. Consequently, the reduction computation at the edge portion of a black letter or the like on a white foundation can prevent the density from dropping, so that an excellent quality image having no blur in the character and line as a reduced image can be obtained.

Although in the respective embodiments, the magnification changing processing has been described by exemplifying the reduction processing, this may be applied to the enlargement processing. Further, although the reduction processing computation is realized by load averaging processing, it is permissible to use other methods than the load averaging processing method. Furthermore, this embodiment may be applied to magnification changing processing in any direction of the main scanning direction and the sub-scanning direction.

(Fifth Embodiment)

Figure 19:
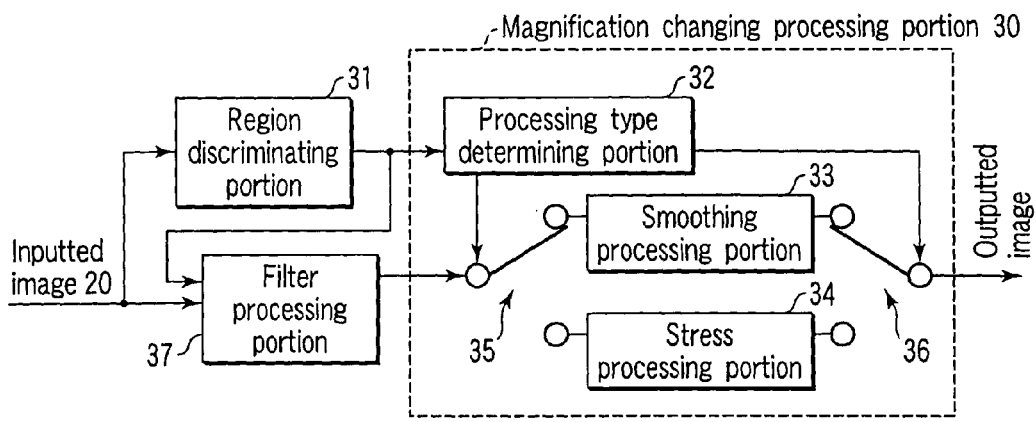
FIG. 19 is an entire block diagram of an image processing apparatus according to the fourth embodiment of the present invention.

A fifth embodiment of the present invention will be described with reference to the accompanying drawings. The configuration of the third embodiment is changed as shown in FIG. 19. Like reference numerals are attached to the same components as the third embodiment and description thereof is omitted.

The discriminating portion 31 outputs a determination result of the character region or photograph region for the inputted image 20 and the filter processing portion 37 carries out filter processing using the determination result. The filter processing portion 37 applies, for example, a high pass filter (HPF) to a character region image and a low pass filter (LPF) to a photograph region image. The magnification changing portion 30 executes magnification changing processing on an image after filter processing.

This configuration enables to emphasis sharpness without increasing the filter size. By changing the magnification changing method for the character region and the photograph region in the magnification changing processing portion 30, drop of the sharpness due to the magnification change can be prevented. Thus, an excellent quality magnified image can be obtained.

(Sixth Embodiment)

Figure 20:
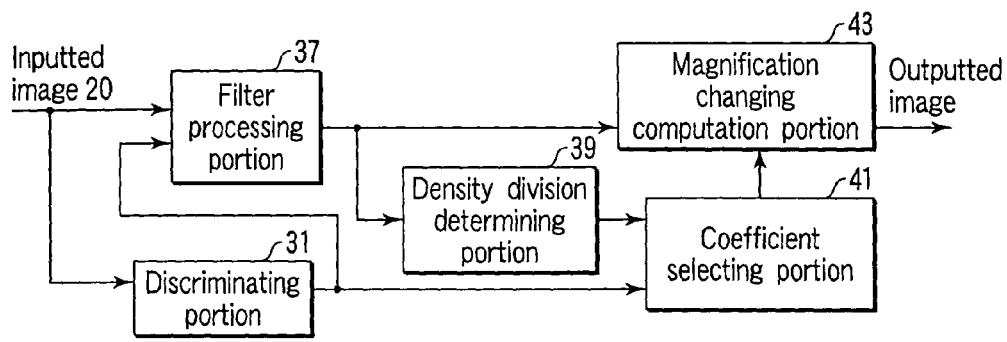
FIG. 20 is an entire block diagram of an image processing apparatus according to a fifth embodiment of the present invention.

Hereinafter, a sixth embodiment of the present invention will be described with reference to the accompanying drawings. The configuration of the fifth embodiment is changed as shown in FIG. 20. Like reference numerals are attached to the same components as the fifth embodiment.

The discriminating portion 31 discriminates the character region and the photograph region of the inputted image 20 and the filter processing portion 31 executes filter processing using a discrimination result. The magnification changing processing of the fourth embodiment is carried out on an image after the filter processing.

This configuration enables to emphasis sharpness without increasing the filter size. By changing the magnification changing method for the character region and the photograph region in the magnification changing processing portion 40, drop of the sharpness due to the magnification change can be prevented. Thus, an excellent quality magnified image can be obtained.

(Seventh Embodiment)

Figure 21:
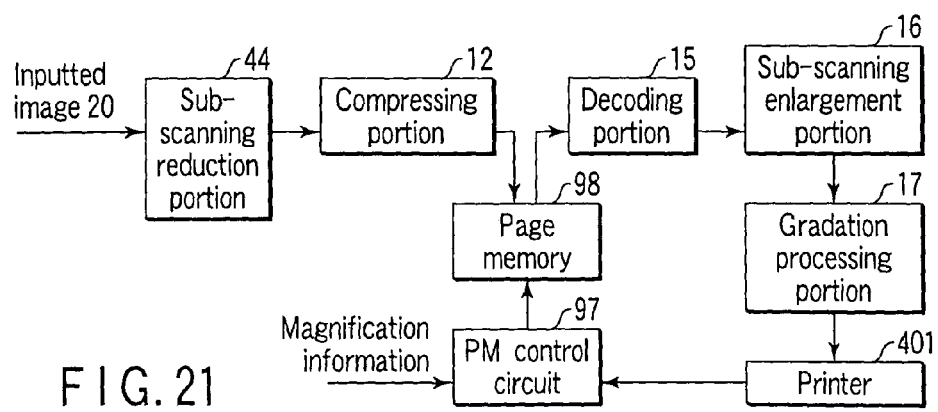
FIG. 21 is an entire block diagram of an image processing apparatus according to a seventh embodiment of the present invention.

A seventh embodiment of the present invention will be described with reference to the accompanying drawings. In this embodiment, the above-described first embodiment is changed as shown in FIG. 21. Like reference numerals are attached to the same components as the first embodiment and description thereof is omitted.

A sub-scanning reduction portion 44 executes reduction processing in the sub-scanning direction on the inputted image 20 which is inputted through the scanner or the like as shown in FIG. 21. The reduction processing is carried out according to a projection method. Because the computation based on the projection method has been already described in the second embodiment, description thereof is omitted here.

By executing sub-scanning reduction before PM input, the quantity of data in the sub-scanning direction is reduced and by executing compression processing, the quantity of data to be written into the PM can be reduced. Further, by reading out compression data written in the PM synchronously with a printer synchronous signal and decoding, synchronism with the printer can be ensured. With such a configuration, the memory amount of the PM can be reduced thereby reducing the H/W cost.

Although the projection method is adopted for the reduction processing in this embodiment, the reduction processing may be carried out by another method.

(Eighth Embodiment)

Figure 22:
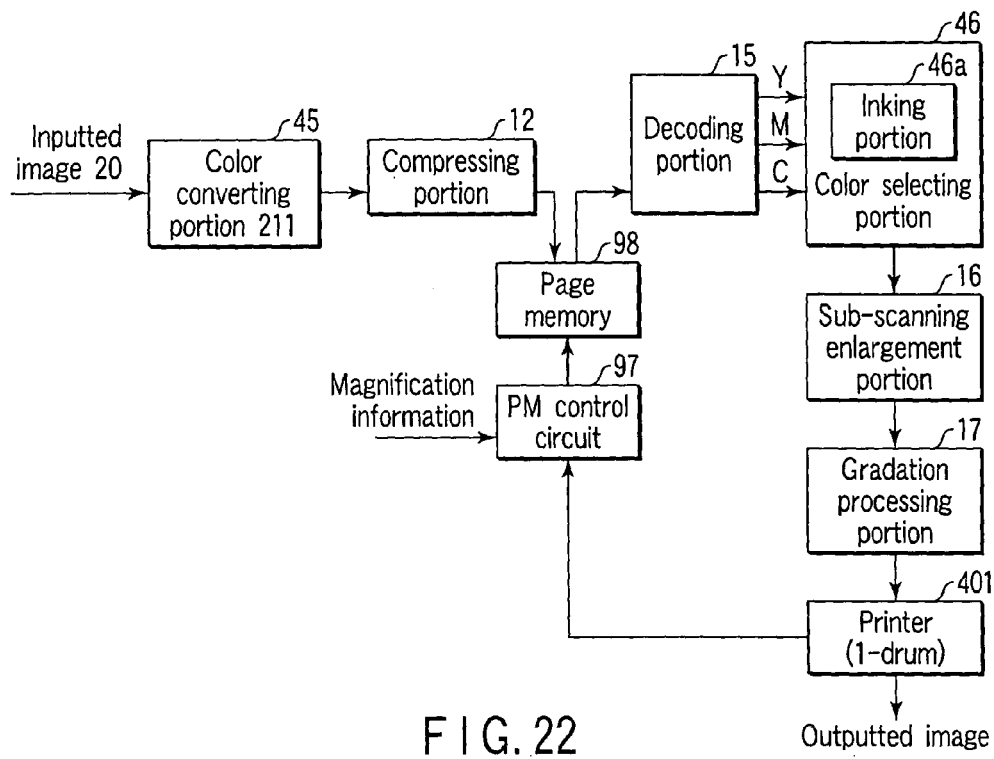
FIG. 22 is an entire block diagram of an image processing apparatus according to an eighth embodiment of the present invention.

Hereinafter, an eighth embodiment of the present invention will be described with reference to the accompanying drawings. In this embodiment, the seventh embodiment described above is changed as shown in FIG. 22. Like reference numerals are attached to the same components as the seventh embodiment and description thereof is omitted.

A color converting portion 45 converts an RGB signal of an RGB inputted image 20 to a CMY signal. The converted CMY signal is compressed by the compression portion 12 and the compressed data is written into the PM. Data written into the PM is read out by the PM control circuit 14 and decoded by the decoding portion 15 so as to provide a YMC signal. The YMC signal is supplied to a color selecting portion 46 and a K (black) signal is generated by an inking portion 46a based on the YMC signal. That is, the YMC signal is converted to a CMYK signal by the color selecting portion 46.

The color selecting portion 46 selects one of the CMYK signals in the order of printing by a printer 401 and supplies the sub-scanning enlargement portion 16 with this signal. For example, if an image is printed by the printer in the order of YMCK, the color selecting portion 46 selects and output the signals in the order of Y, M, C and K. The sub-scanning enlargement portion 16 executes enlargement processing on an outputted signal and the gradation processing portion 17 executes gradation processing such as dither, so that each color image is printed out by the printer. In this case, the printer has one photosensitive drum.

To print out with the printer, four color CMYK signals are necessary. Thus, the YMC signals are read out from the PM four times and one of the CMYK signals is selected by the color selecting portion 46 each time so as to print out four colors. That is, each time when the CMY signals are read out from the PM, one color of the YMCK is printed out. Each time when one color is printed out, the YMC signals are read out from the PM, and a signal of other color which is not yet printed out is selected by the color selecting portion 46.

Consequently, the sub-scanning enlargement portion 16 is provided with the H/W configuration for a single color, so that the size of the H/W can be reduced thereby its necessary cost being reduced.

This embodiment may be applied to the magnification changing processing in any direction of the main scanning direction and the sub-scanning direction. The enlargement processing and the reduction processing are realized using the linear interpolation method and the projection method. However, the enlargement processing and reduction processing may be carried out not by the above-mentioned method but other method.

(Ninth Embodiment)

Figure 23:
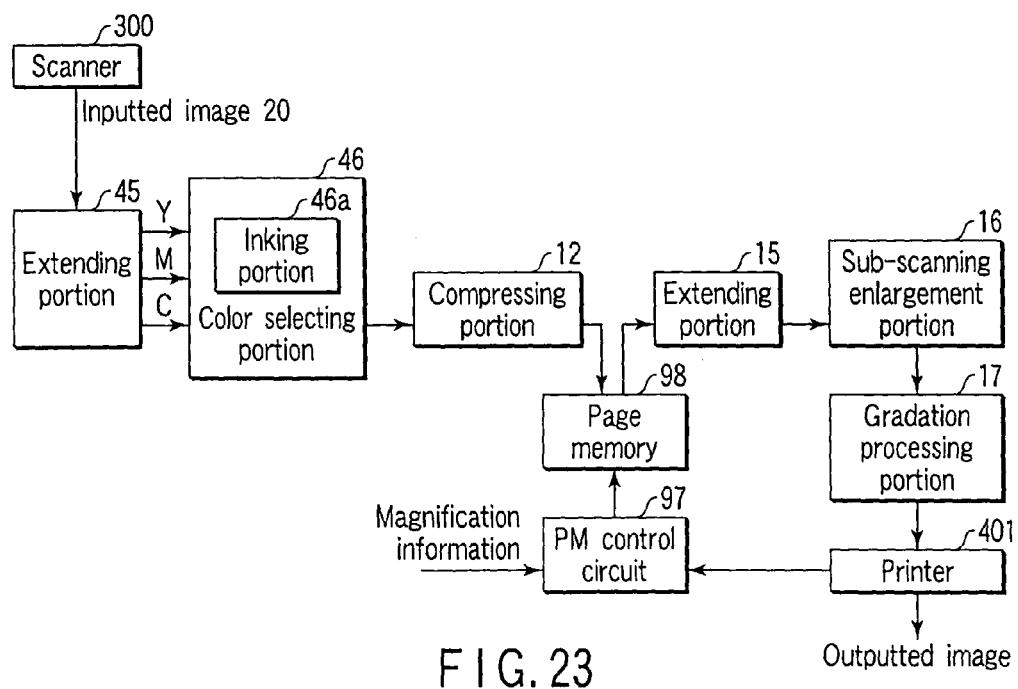
FIG. 23 is an entire block diagram of an image processing apparatus according to a ninth embodiment of the present invention.

A ninth embodiment of the present invention will be described with reference to the accompanying drawings. In this embodiment, the configuration of the eighth embodiment is changed as shown in FIG. 23. Like reference numerals are attached to the same components as the eighth embodiment and description thereof is omitted.

The scanner 300 reads an original paper and outputs the RGB signal. A signal 20 outputted from the scanner 300 is processed by the color converting portion 45 and the color selecting portion 46 and then one color of the CMYK signals is outputted. The compressing portion 12 compresses the outputted signal and writes into the PM. The control circuit 97 reads out the compression data from the PM, executes decoding, magnification changing, and gradation and an image of one color is printed by the printer 401. In this case also, the printer 401 has a photosensitive drum. Each time when an image of one color is printed out by the printer 401, the color selecting portion 46 selects one color not printed and outputs it to the compressing portion 12.

By repeating a processing from this image reading to the printing four times, an image of four CMYK colors is printed out on a paper. That is, the same image is read by the scanner four times. Because the color selecting portion 46 selects and outputs one color of the four CMYK colors, the memory amount of the PM can be configured with a memory for a single color, and therefore, the memory amount can be reduced, thereby achieving a cheap H/W cost.

What is claimed is:

1. An image processing apparatus comprising: a compressing portion which compresses an inputted image;
a page memory which stores the compressed image from the compression portion;
a decoding portion which decodes the compressed image stored in the page memory;
a control portion which controls write and read of an image with respect to the page memory;
a magnification changing portion which carries out magnification changing processing of changing the image size for the image decoded by the decoding portion; and
a printer which prints the image provided from the magnification changing portion, and generates printer synchronous signal each time when the printer scans an image formation object surface,
the control portion supplies the page memory, the decoding portion and the magnification changing portion with control signals so as to synchronize reading of the image from the page memory, the decoding processing of the decoding portion and the magnification changing processing of the magnification changing portion with the printer synchronous signal provided from the printer,
wherein the control portion generates first and second synchronous signals synchronous with the printer synchronous signal based on an inputted magnification rate, the compressed images of a predetermined quantity of lines being read out from the page memory in response to the first synchronous signal,
the decoding portion decodes the compressed image read out from the page memory in response to the second synchronous signal, and
the magnification changing portion computes interpolation data from the image decoded by the decoding portion based on the magnification rate in response to the printer synchronous signal.

2. The apparatus according to claim 1, wherein the compression portion carries out fixed length compression of generating compression data of a fixed length from the inputted image of a predetermined length.

3. The apparatus according to claim 1, further comprising a reduction portion which supplies the compressing portion with a reduced image by carrying out sub-scanning direction reduction processing on the inputted image corresponding to an inputted reduction rate, wherein the magnification changing portion executes a sub-scanning direction enlargement processing.

4. The apparatus according to claim 3, wherein the reduction portion has a line memory which holds a halfway result of reduction computation and carries out accumulative addition using the halfway result held by the line memory so as to obtain the reduced image.

5. The apparatus according to claim 3, wherein the reduction portion carries out the sub-scanning direction reduction processing according to a projection method and comprises:
a first line memory which delays the inputted image by a line;
a rate computing portion which computes the rate of pixels in the inputted image included in pixels in a reduced image, corresponding to the reduction rate inputted;
a computing portion which multiplies the inputted image and an image delayed by the first line memory with corresponding rates computed by the rate computing portion, and sums up respective multiplication results so as to provide a computation result;
a second line memory which stores a first computation result of the computing portion;
an adding portion which adds a second computation result of the computing portion to the first computation result stored in the second line memory;
a dividing portion which computes a sampling interval indicating a reference amount of pixels in the inputted image corresponding to the reduction rate inputted and divides data provided by one of the computing portion and the adding portion by the sampling interval; and
a switching portion which changes over which data provided from the computing portion is to be transferred to the second line memory or provided to the dividing portion,
the rate computing portion controlling the switching portion corresponding to the computed rate.

6. The apparatus according to claim 1, further comprising a discriminating portion which discriminates a character region and a photograph region of the inputted image so as to output a corresponding discrimination signal, wherein the magnification changing portion changes a magnification changing method for the character region and the photograph region based on the discriminating signal outputted from the discriminating portion.

7. The apparatus according to claim 6 wherein the magnification changing portion comprises:
an averaging processing portion which carries out magnification changing processing on the inputted image based on averaging processing;
a emphasis processing portion which carries out the magnification changing processing on the inputted image based on emphasis processing; and
a processing type determining portion which determines a processing type based on the discrimination signal provided from the discriminating portion, selects the averaging processing portion for the photograph region while the emphasis processing portion for the character region and executes a processing of the processing portion selected for the inputted image.

8. The apparatus according to claim 6, further comprising a coefficient determining portion which determines a coefficient to pixels in the inputted image based on the discrimination signal outputted from the discriminating portion, wherein the magnification changing portion carries out reduction processing according to a projection method and generates a reduced image using a rate to the pixels in the inputted image determined by the inputted reduction ratio and the coefficient.

9. The apparatus according to claim 6, further comprising a coefficient determining portion which determines a coefficient to each pixel in the inputted image based on the discrimination signal outputted from the discriminating portion and the density of the pixels in the inputted image, wherein the magnification changing portion carries out reduction processing according to a projection method and generates a reduced image using the rate to each pixel in the inputted image determined by the inputted magnification and the coefficient.

10. The apparatus according to claim 7, further comprising a filter portion which executes different filter processings upon the character region and photograph region of the inputted image corresponding to the discrimination signal provided from the discriminating portion, wherein the magnification changing portion carries out the magnification changing processing on an image undergone the filter processing by the filter portion.

11. The apparatus according to claim 1, further comprising a generating portion which generates a K(black) signal based on a YMC signal constituting the image decoded by the decoding portion; and
a color selecting portion which selects a signal of one color from the YMC and K signals and supplies to the image magnification changing portion, wherein
the printer has a photosensitive drum and prints out every color of the image provided from the magnification changing portion and the control portion reads out the compressed image from the page memory each time when an image of each color is printed out by a page by the printer.

12. The apparatus according to claim 1, further comprising:
reading means for reading a color image and providing an RGB signal;
a color converting portion which carries out color converting processing on the RGB image signal provided by the reading means and provides a YMC signal;
a generating portion which generates a K(black) signal based on a YMC signal provided by the color converting portion; and
a color selecting portion which selects a signal of one color of the YMC and K signals and provides to the compressing portion, wherein
the printer has a photosensitive drum and prints out every color of the image provided from the magnification changing portion and each time when an image of each color is printed out by a single page by the printer, and the color selecting portion selects a signal of not yet printed color and outputs to the compressing portion.

13. An image processing apparatus comprising:
a discriminating portion which discriminates a character region and a photograph region of an inputted image and outputs a corresponding discrimination signal; and
a magnification changing portion which changes a magnification changing method for the character region and the photograph region based on the discrimination signal outputted from the discriminating portion and changes the magnification of the inputted image,
wherein the magnification changing portion comprises:
an averaging processing portion which carries out magnification changing processing on an inputted image based on the averaging processing;
a emphasis processing portion which carries out the magnification changing processing on the inputted image based on the emphasis processing; and
a processing type determining portion which determines a processing type based on the discrimination signal provided from the discriminating portion, selects the averaging processing portion for the photograph region while the emphasis processing portion for the character region and executes a processing of the processing portion selected for the inputted image.

14. The apparatus according to claim 13, further comprising a coefficient determining portion which determines a coefficient to pixels in the inputted image based on the discrimination signal outputted from the discriminating portion, wherein the magnification changing portion carries out reduction processing and generates a reduced image using a rate to the pixels in the inputted image determined by the reduction ratio inputted and the coefficient.

15. The apparatus according to claim 13, further comprising a coefficient determining portion which determines a coefficient to each pixel in the inputted image based on the discrimination signal outputted from the discriminating portion and the density of the pixels in the inputted image, wherein the magnification changing portion carries out reduction processing and generates a reduced image using the rate to each pixel in the inputted image determined by the magnification inputted and the coefficient.

16. The apparatus according to claim 13, further comprising a filter portion which executes different filter processings upon the character region and
photograph region of the inputted image corresponding to the discrimination signal provided from the discriminating portion, wherein the magnification changing portion carries out the magnification changing processing on the image undergone the filter processing by the filter portion.

17. The apparatus according to claim 14, further comprising a filter portion which executes different filter processings upon the character region and photograph region of the inputted image corresponding to the discrimination signal provided from the discriminating portion, wherein the magnification changing portion carries out the reduction processing on the image undergoing the filter processing by the filter portion and generates the reduced image.

18. The apparatus according to claim 15, further comprising a filter portion which executes different filter processings upon the character region and photograph region of the inputted image corresponding to the discrimination signal provided from the discriminating portion, wherein magnification changing portion carries out the reduction processing on the image undergoing the filter processing by the filter portion and generates the reduced image.

19. An image processing apparatus comprising: a compressing portion which compresses an inputted image;
a page memory which stores the compressed image from the compression portion;
a decoding portion which decodes the compressed image stored in the page memory;
a control portion which controls write and read of an image with respect to the page memory;
a magnification changing portion which carries out magnification changing processing of changing the image size for the image decoded by the decoding portion;
a printer which prints the image provided from the magnification changing portion, and generates printer synchronous signal each time when the printer scans an image formation object surface; and
a reduction portion which supplies the compressing portion with a reduced image by carrying out sub-scanning direction reduction processing on the inputted image corresponding to an inputted reduction rate, wherein the magnification changing portion executes a sub-scanning direction enlargement processing,
the control portion supplies the page memory, the decoding portion and the magnification changing portion with control signals so as to synchronize reading of the image from the page memory, the decoding processing of the decoding portion and the magnification changing processing of the magnification changing portion with the printer synchronous signal provided from the printer,
wherein the reduction portion carries out the sub-scanning direction reduction processing according to a projection method and comprises:

a first line memory which delays the inputted image by a line;

a rate computing portion which computes the rate of pixels in the inputted image included in pixels in a reduced image, corresponding to the reduction rate inputted;

a computing portion which multiplies the inputted image and an image delayed by the first line memory with corresponding rates computed by the rate computing portion, and sums up respective multiplication results so as to provide a computation result;

a second line memory which stores a first computation result of the computing portion;

an adding portion which adds a second computation result of the computing portion to the first computation result stored in the second line memory;

a dividing portion which computes a sampling interval indicating a reference amount of pixels in the inputted image corresponding to the reduction rate inputted and divides data provided by one of the computing portion and the adding portion by the sampling interval; and a switching portion which changes over which data provided from the computing portion is to be transferred to the second line memory or provided to the dividing portion, the rate computing portion controlling the switching portion corresponding to the computed rate.

20. An image processing apparatus comprising: a compressing portion which compresses an inputted image;

a page memory which stores the compressed image from the compression portion;

a decoding portion which decodes the compressed image stored in the page memory;

a control portion which controls write and read of an image with respect to the page memory;

a magnification changing portion which carries out magnification changing processing of changing the image size for the image decoded by the decoding portion;

a printer which prints the image provided from the magnification changing portion, and generates printer synchronous signal each time when the printer scans an image formation object surface; and a discriminating portion which discriminates a character region and a photograph region of the inputted image so as to output a corresponding discrimination signal, wherein the magnification changing portion changes a magnification changing method for the character region and the photograph region based on the discriminating signal outputted from the discriminating portion, the control portion supplies the page memory, the decoding portion and the magnification changing portion with control signals so as to synchronize reading of the image from the page memory, the decoding processing of the decoding portion and the magnification changing processing of the magnification changing portion with the printer synchronous signal provided from the printer, wherein the magnification changing portion comprises:

an averaging processing portion which carries out magnification changing processing on the inputted image based on averaging processing;

a emphasis processing portion which carries out the magnification changing processing on the inputted image based on emphasis processing; and a processing type determining portion which determines a processing type based on the discrimination signal provided from the discriminating portion, selects the averaging processing portion for the photograph region while the emphasis processing portion for the character region and executes a processing of the processing portion selected for the inputted image.

21. The apparatus according to claim 20, further comprising a filter portion which executes different filter processings upon the character region and photograph region of the inputted image corresponding to the discrimination signal provided from the discriminating portion, wherein the magnification changing portion carries out the magnification changing processing on an image undergone the filter processing by the filter portion.

22. An image processing apparatus comprising: a compressing portion which compresses an inputted image;

a page memory which stores the compressed image from the compression portion;

a decoding portion which decodes the compressed image stored in the page memory;

a control portion which controls write and read of an image with respect to the page memory;

a magnification changing portion which carries out magnification changing processing of changing the image size for the image decoded by the decoding portion;

a printer which prints the image provided from the magnification changing portion, and generates printer synchronous signal each time when the printer scans an image formation object surface;

reading means for reading a color image and providing an RGB signal;

a color converting portion which carries out color converting processing on the RGB image signal provided by the reading means and provides a YMC signal;

a generating portion which generates a K(black) signal based on a YMC signal provided by the color converting portion; and a color selecting portion which selects a signal of one color of the YMC and K signals and provides to the compressing portion, wherein the control portion supplies the page memory, the decoding portion and the magnification changing portion with control signals so as to synchronize reading of the image from the page memory, the decoding processing of the decoding portion and the magnification changing processing of the magnification changing portion with the printer synchronous signal provided from the printer, and wherein the printer has a photosensitive drum and prints out every color of the image provided from the magnification changing portion and each time when an image of each color is printed out by a single page by the printer, and the color selecting portion selects a signal of not yet printed color and outputs to the compressing portion.

* * * * *